United States Patent [19]

Murakami et al.

[11] Patent Number: 4,506,639

[45] Date of Patent: Mar. 26, 1985

[54] METHOD AND SYSTEM FOR CONTROLLING THE IDLE SPEED OF AN INTERNAL COMBUSTION ENGINE AT VARIABLE IGNITION TIMING

[75] Inventors: Kazuhiro Murakami, Kamifukuoka; Hisamitsu Yamazoe, Kariya; Toshiaki Mizuno, Nagoya, all of Japan

[73] Assignee: Nippondenso Co., Ltd., Kariya, Japan

[21] Appl. No.: 462,544

[22] Filed: Jan. 31, 1983

[30] Foreign Application Priority Data

Jan. 29, 1982 [JP] Japan .................................. 57-13898

[51] Int. Cl.³ .............................................. F02D 37/02
[52] U.S. Cl. .................................... 123/339; 123/352; 123/418
[58] Field of Search ......................... 123/339, 352, 418

[56] References Cited

U.S. PATENT DOCUMENTS

| | | | |
|---|---|---|---|
| 4,289,100 | 9/1981 | Kinugawa et al. | 123/339 |
| 4,328,775 | 5/1982 | Ironside | 123/339 |
| 4,338,899 | 7/1982 | Geiger et al. | 123/418 |
| 4,344,397 | 8/1982 | Geiger et al. | 123/339 |
| 4,425,890 | 1/1984 | Yamaguchi | 123/418 |

Primary Examiner—Andrew M. Dolinar
Attorney, Agent, or Firm—Cushman, Darby & Cushman

[57] ABSTRACT

Engine operating parameters are detected to see whether the engine is in idle state or not. Then the speed of the engine is detected to determine whether engine speed is varying or not. To this end, a plurality of engine speed data are averaged to find an average engine speed which will be used as a reference value for the comparison with respect to a latest instantaneous engine speed. Ignition timing is either retarded or advanced for maintaining the engine speed at a desired value in such a manner that the amount of correction of the ignition timing is determined by deriving data from a memory in which relationship between the engine speed variation and ignition timing correction amount is stored in the form of a map. In the case that the average engine speed is far deviated from a setting engine speed, the average value is not used as the reference value, but rather the setting speed is used to find the difference. In the case that no setting engine speed is provided, the average engine speed is always used as the reference value. In addition to ignition timing control, the airflow bypassing the throttle valve may be controlled so that idle engine speed does not fluctuate.

13 Claims, 14 Drawing Figures

METHOD AND SYSTEM FOR CONTROLLING THE IDLE SPEED OF AN INTERNAL COMBUSTION ENGINE AT VARIABLE IGNITION TIMING

BACKGROUND OF THE INVENTION

This application is related to co-pending U.S. application Ser. No. 321,227 filed on Nov. 13, 1981, now U.S. Pat. No. 4,446,832, assigned to Nippondenso Co. Ltd.

This invention relates generally to method and system for controlling the idle speed of an internal combustion engine of spark ignition type to suppress the variation in idle engine speed under varying operating conditions.

Various methods and systems for preventing the idle engine speed from undesirably varying in response to rapid load change, and in a conventional method, the intake airflow or air-fuel ratio of the mixture supplied to the engine is controlled for the purpose of controlling idle speed.

In such a conventional method or system, however, a quick response cannot be expected even if the amount of fuel or air-fuel mixture is increased in response to the detection of engine speed drop due to the slow response characteristic inherent to the air supply system and the fuel supply system. Namely, effective torque for compensating for the engine speed drop is generated after the engine speed is lowered to an extent determined by the condition in the absence of various additions, and therefore, such feedback control involving air-fuel ratio control cannot provide desirable quick control of engine idle speed especially in the case of a rapid change. Furthermore an excessive control in such a conventional control results in interference with the feedback control of the air-fuel ratio. As a result of such interference, the effective control would be difficult while there is a fear that extensive hunting for an air-fuel ratio may occur.

In order to solve the above problem caused by the slow response in the air-fuel control system, a control method involving ignition timing control was devised. However, this method also suffers from the problem that undesirable extensive hunting for an engine speed results around a setting speed when the control is peformed excessively.

SUMMARY OF THE INVENTION

The present invention has been developed in order to remove the above-described drawbacks inherent to the conventional method and systems for controlling idle speed.

It is, therefore, an object of the present invention to provide method and system for idle speed control which is quickly responsive to rapidly changing engine operating conditions.

According to a feature of the present invention when the engine idle speed $N_i$, i.e. a latest instantaneous engine speed, is within a predetermined range (for instance, $N_i = N_F \pm 20$ rpm) defined by a setting speed $N_F$, an average rotational speed $\overline{N}$ over a predetermined period of time or a predetermined number of revolutions is used as the setting speed $N_F$ for calculating correction amounts of ignition timing, and on the other hand, when the engine idle speed Ni is out of the above-mentioned predetermined range, the value of the setting speed $N_F$ is used as it is for calculating the correction amounts of ignition timing.

Furthermore, when no setting speed $N_F$ is provided, for instance, when the engine is subjected to open control during warming up, the average engine speed $\overline{N}$ is used in place of the setting speed $N_F$ throughout the entire engine operating range for calculating correction amounts of ignition timing.

In this way according to the present invention the average value of a plurality of engine speed values is obtained and used as a reference for the comparison with the latest instantaneous engine speed. Therefore, the engine speed easily converges to the average value within a short period of time, without suffering from undesirable phenomena, such as excessive control, hunting or the like.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Figure 1:
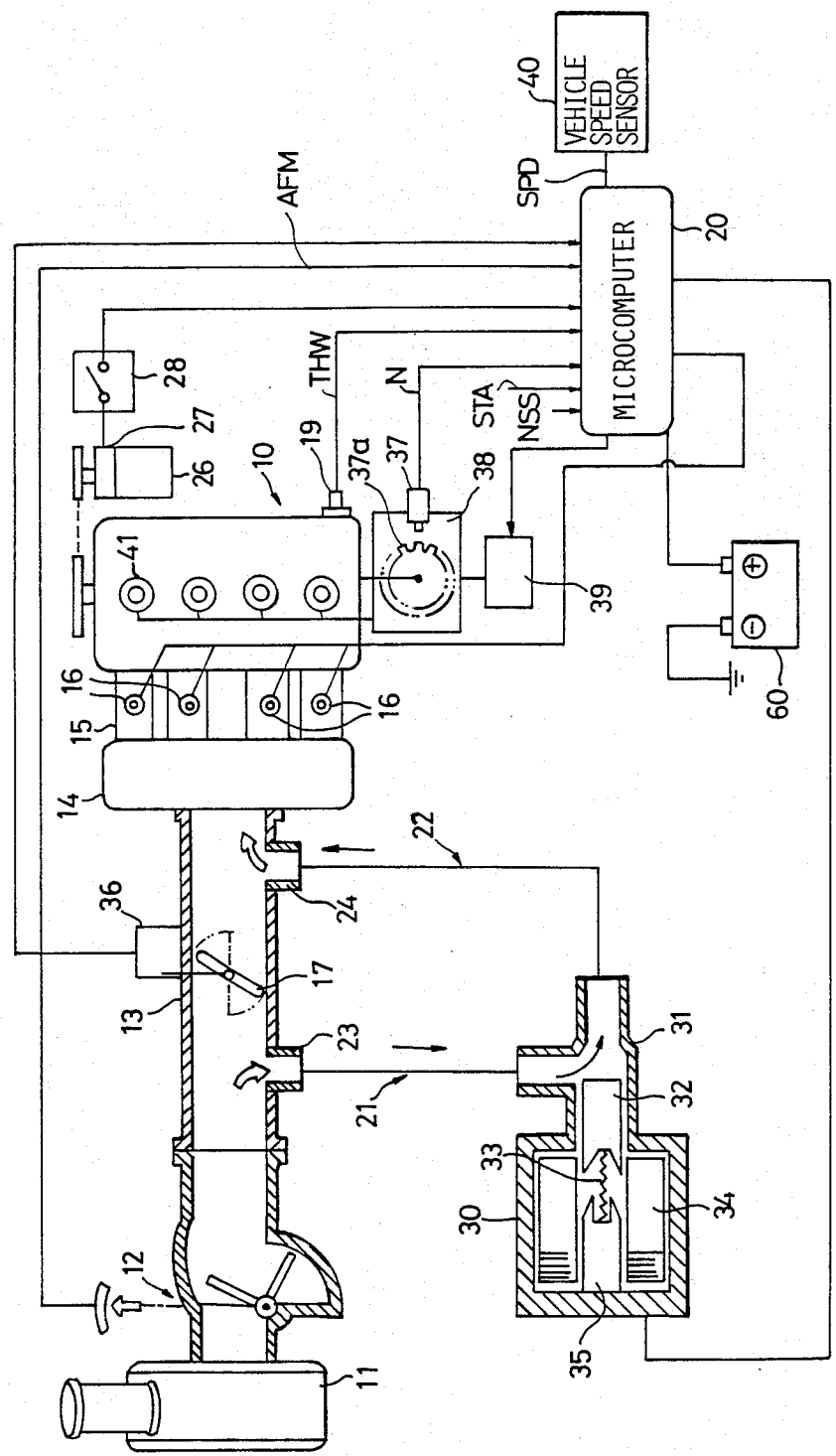
FIG. 1 is a schematic diagram showing an embodiment of an idle speed control system according to the present invention.

Referring now to the drawings in detail, and more particularly to FIG. 1, an embodiment of an idle speed control system according to the present invention is shown. The idle speed control system is shown to be incorporated in a fuel-injection internal combustion engine of a motor vehicle for the purpose of disclosure. According to the principal aspect of the invention, the idle speed of the engine is controlled by optimizing the ignition timing so that variations in the idle speed is held within an acceptable range under varying operating conditions. The idle speed contrtol system preferably includes an auxiliary air delivery system which introduces additional air to the engine through a conduit bypassing the throttle valve of the main air intake passage of the engine. As will be described later, the auxiliary air delivery system is controlled in combination with the idle speed ignition timing control to further suppress the idle speed to a narrower range. It is to be noted that the present invention could also be incorporated in carburetor-controlled engines and that the auxiliary air delivery system could be replaced with a system which controls the throttle opening of the main intake air.

The engine of FIG. 1, generally designated at 10, is a well known four-cycle spark ingition internal combustion engine arranged to be supplied with intake air through an air cleaner 11 and the main air intake passage 13 in which an airflow meter 12 and a throttle valve 17 are located upstream of a surge tank 14 communicating with an intake manifold 15. A plurality of solenoid operated fuel injection valves 16 are provided to the intake manifold 15 for supplying the engine 10 with fuel such as gasoline.

The main intake air quantity of the engine 10 is controlled by the throttle valve 17 which is responsive to the operator controlled accelerator pedal (not shown), while the fuel quantity is controlled by the injection valves 16 in response to fuel control pulses supplied from a microcomputer 20. The microcomputer 20 receives engine speed indicating parameter N in the form of pulses from an electromagnetic pickup device 37 located in an ignition distributor 38 and an intake airflow parameter AFM from the airflow meter 12 as basic input parameters for electronically controlling the quantity of fuel to be injected in a known manner. The microcomputer 20 is also supplied with a warm-up signal THW from a warm-up sensor 19 to additionally control the fuel quantity. For the purpose of idle speed control the microcomputer 20 is arranged to receive other signals including a throttle position signal from a throttle sensor 36 indicating that the throttle valve 17 is at or near the fully closed position, or at the fully open position. The microcomputer 20 is also resposive to an air conditioner on-off signal A/C from a power switch 28 of an air conditioning unit of the vehicle. In addition to these signals, an engine starter signal STA from an engine starter (not shown), and a neutral safety signal NSS, which is also referred to as a torque converter signal hereafter, from an automatic transmission (not shown) are arranged to be fed to the microcomputer 20.

Air conduits 21 and 22 are provided to bypass the throttle valve 17 in such a manner that an air control valve 30 is interposed between the air conduits 21 and 22. One end of the air conduit 21 communicates with an air inlet 23 communicating with the main air intake passage 13 at a position between the airflow meter 12 and the throttle valve 17, and one end of the other air conduit 22 communicates with an air outlet 24 provided downstream of the throttle valve 17.

The air control valve 30 is basically of linear solenoid type and has a casing 31 and a plunger 32 movable relative to the casing 31. Namely, the air control valve 30 changes an effective air passage area between the air conduits 21 and 22 by the displacement of the plunger 32 which is normally biased by a compression spring 33 so that the air passage area equals zero. An electromagnetic device or coil 34 of the air control valve 30 is arranged to be energized for producing an attractive force which attracts the plunger 32 toward a core 35. Thus, the plunger 32 moves toward the core 35 depending on the average of the energizing current. In this way, the position of the plunger 32 is controlled in accordance with the average current applied to the electromagnetic device 34 to cause the continuous change in the air passage area between the air conduits 21 and 22. Therefore, the airflow through the bypass, i.e. the air conduits 21 and 22, can be controlled by the current.

The electromagnetic device 34 of the air control valve 30 is driven by the microcomputer 20, while the microcomputer 20 also controls the fuel injection valves 16. The structure of the air control valve 30 is not limited to the above-described one. Namely, a valve using a diaphragm or a stepping motor can also be used in place of the solenoid controlled valve.

The electromagnetic pickup 37 is provided so that it faces a ring gear 37a rotating in synchronism with the engine crankshaft for generating a pulse train signal having a frequency proportional to the engine speed. The ring gear 37a is incorporated in a distributor 38. In the illustrated embodiment, the electromagnetic pickup 37 is arranged to produce a pulse each time the crankshaft assumes 30°. The warm-up sensor 19 comprises a thermal sensor such as a thermistor for measuring coolant temperature or the like indicative of the engine temperature. The distributor 38 is of conventional structure so that it delivers high voltage to respective spark plugs 41. The igniton device 39 is arranged to receive a signal indicating ignition timing and energizing period for producing high voltage pulser, and comprises an ignitor, i.e. an ignition control unit, and an ignition coil which are both well known.

When the air conditioner power switch 28 is turned on, an electromagnetic clutch 27 is put in connecting state in which a compressor of the air conditioning unit is coupled to the engine 10 as its load.

A vehicle speed sensor 40 is provided to produce pulses proportional to the rotational speed of a vehicle wheel, and the pulse signal SPD indicative of the vehicle speed is fed to the microcomputer 20.

Figure 2:
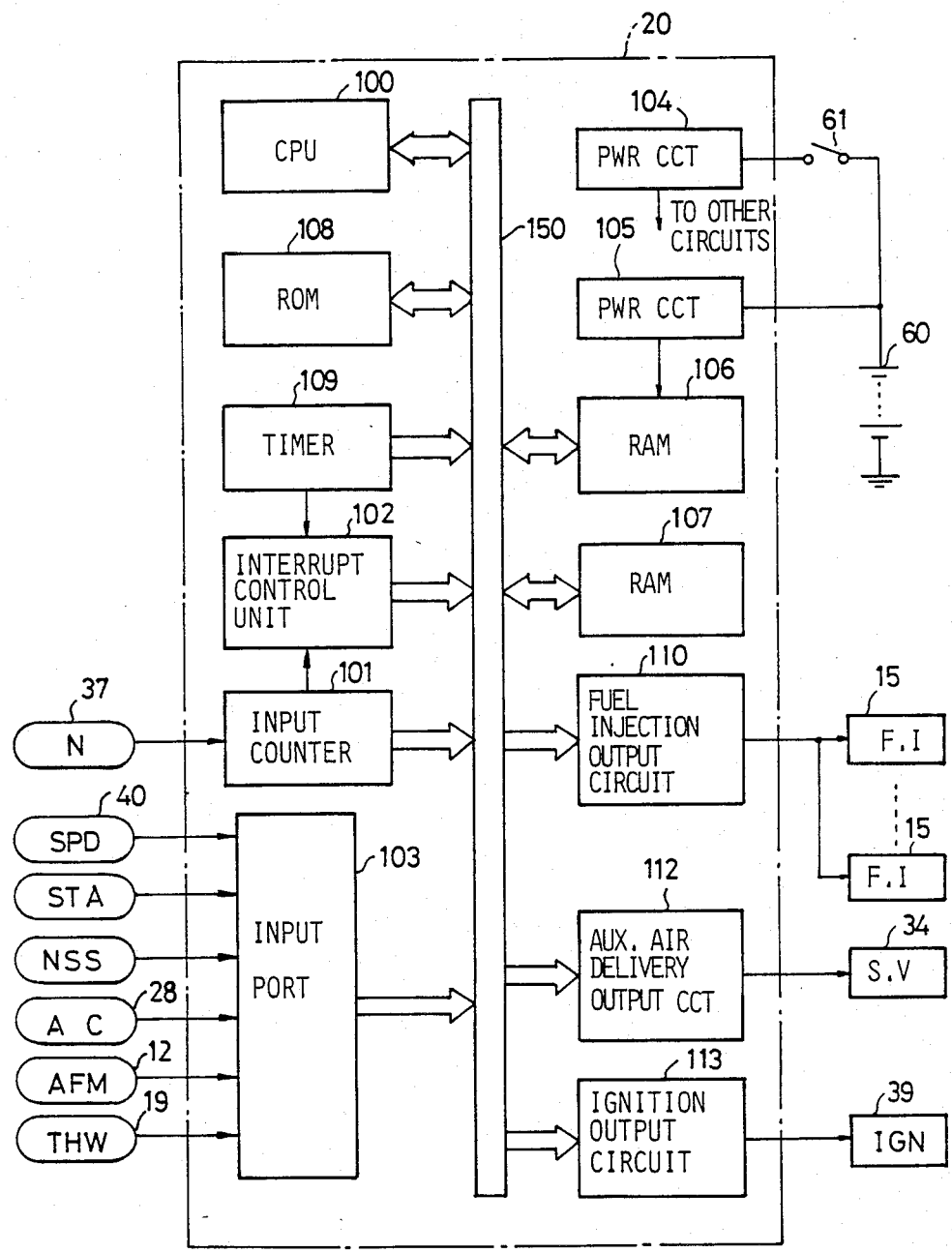
FIG. 2 is a schematic block diagram showing a microcomputer used in the control system of FIG. 1.

The structure of the microcomputer 20 will be described with reference to FIG. 2. The microcomputer 20 comprises a central processing unit (CPU) 100, several memories and various peripheral or auxilary circuits so that desirable or optimum ignition timing, fuel injection amount and auxiliary airflow are computed in accordance with a predetermined program. The CPU 100 per se is well known, and one of 8, 12 or 16 bit type may be used.

An input counter 101 is provided for counting the number of pulses from the electromagnetic pickup 37 so that data N indicative of engine speed is fed to the CPU 100. The input counter 101 also has a function of generating an interrupt command signal in synchronism with the engine rotation. The interrupt command signal is fed to an interrupt control circuit 102 which sends an interrupt request via a bus 150 to the CPU 100.

An input port 103 comprises an A/D converter, a multiplexer or the like for receiving signals from various sensors and transmitting the same via the bus 150 to the CPU 100. In detail, the intake airflow signal AFM from the airflow meter 12, coolant temperature signal THW from the warm-up sensor 19, air conditioner signal A/C from the air conditioner power switch 28, torque converter signal NSS from the unshown automatic transmission, vehicle speed signal SPD from the vehicle speed sensor 40, starter signal STA from the engine starter are fed to the input port 103.

Power supply circuit 104 and 105 are provided for regulating the output voltage from a vehicle-mounted battery 60. The first power supply circuit 104 is connected via a key switch 61 to the battery 60, while the second power supply circuit 105 is directely connected to the battery 60. The second power supply circuit 105 is arranged to supply a random-access-memory (RAM) 106 with power all the time, and the first power supply circuit 104 is arranged to supply remaining circuits with power when the key switch 61 is in on stae.

In addition to the above-mentioned RAM 106, there is another RAM 107 receiving power from the first power supply circuit 104. These RAMs 106 and 107 are used to temporarily store various data so that the CPU 100 executes programs as will be described later. Since the first RAM 106 always receives power irrespective of the state of the key switch 61, the contents stored therein are prevented from being erased. In other words, the first RAM 106 functions as a nonvolatile memory of power backup type.

A read-only-memory (ROM) 108 is provided to store various programs as well as constants necessary for calculations, and is arranged such that the contents thereof are read out via the bus 150 by the CPU 100.

A timer 109 is provided to measure lapse of time by counting the number of clock pulses. Thus, the timer 109 supplies the CPU 100 with clock pulses, and also produces an interrupt command signal at a predetermined interval, which is fed to the interrupt control circuit 102.

Three output circuits 110, 112 and 113 are provided to respectively deliver output signals to the fuel injection valves 15, auxialiary airflow control valve 30, and to the ignition control device 39. Therefore, these three output circuits 110, 112 and 113 are respectively referred to as fuel injection output circuit, auxiliary air delivery output circuit and ignition output circuit. Each of these three output circuits 110, 112 and 113 comprises a latch, down counter, power transistor so that it produces an output actuating or driving signal in accordance with the results of calculations executed by the CPU 100. The fuel injection output circuit 110 produces a pulse train signal, having a pulse width indicative of fuel injection amount in accordance with fuel amount data obtained by the CPU 100. The auxiliary air delivery output circuit 112 produces a pulse train signal having a duty cycle which varies to control the auxiliary airflow bypassing the throttle valve 17. This pulse signal is fed to the coil 34 of the air control valve 30. The ignition output circuit 113 produces an ignition timing signal in accordance with the control amount calculated by the CPU 100 so that ignition timing is controlled.

Figure 3:
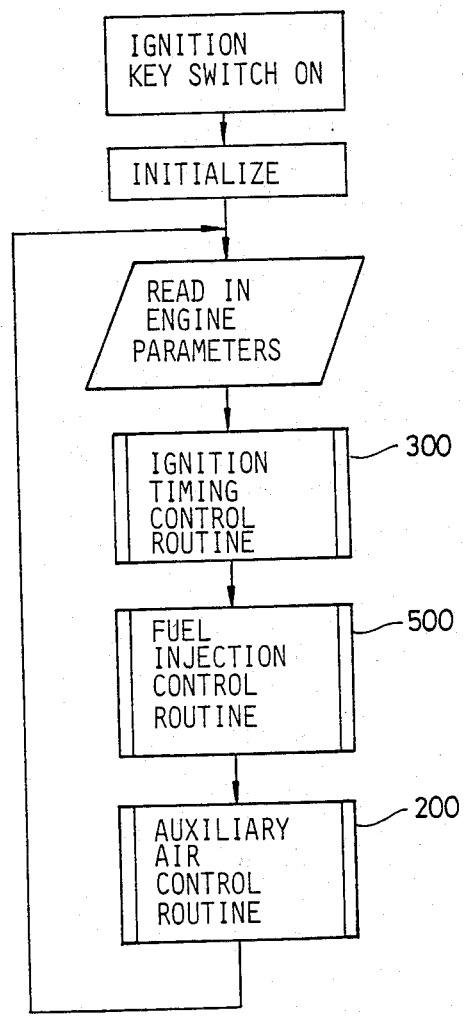
FIG. 3 is a flowchart showing a main routine of the program executed by the microcomputer of FIG. 2.

Now the operation of the microcomputer 20, especially the CPU 100 thereof, will be described with reference to flowcharts of FIGS. 3, 4, 6 and 7. FIG. 3 illustrates a main routine stored in the ROM 108. The microcomputer 20 is arranged to operate in accordance with the main routine in which various controls are effected as will be described later. The main routine is provided so that three different controls will be effected, one being ignition timing control, another being auxiliary airflow control, and the last being fuel injection control. Namely, ignition timing, auxiliary airflow and fuel injection amount are respectively controlled repeatedly. In order that the CPU 100 is capable of executing these three controls, a high-speed processor is used. The above three kinds of controls are performed by using various engine parameters, vehicle speed or the like, and data indicative of such information are processed in unshown subroutines or interrupt service routines. In the illustrated embodiment although the above three kinds of controls are performed by the main routine, some or all of these controls may be arragned to be executed by subroutines or interrupt serivice routines if desired.

Referring to FIG. 3 showing the main routine, the operational flow of the microcomputer 20 enters into a step 100 when the key switch 61 is turned on. As soon as the main routine is started, initialization is performed in a following step to prepare for the following operations. After initialization, various engine parameters and other data are read in. Namely these data are stored in the RAM 106 or 107. Then three different programs or routines follow one after another to effect the abovementioned three controls. Namely, an ignition timing computing routine 300, a fuel injection amount computing routine 500 and auxiliary airflow computing routine 200 are executed.

Figure 4:
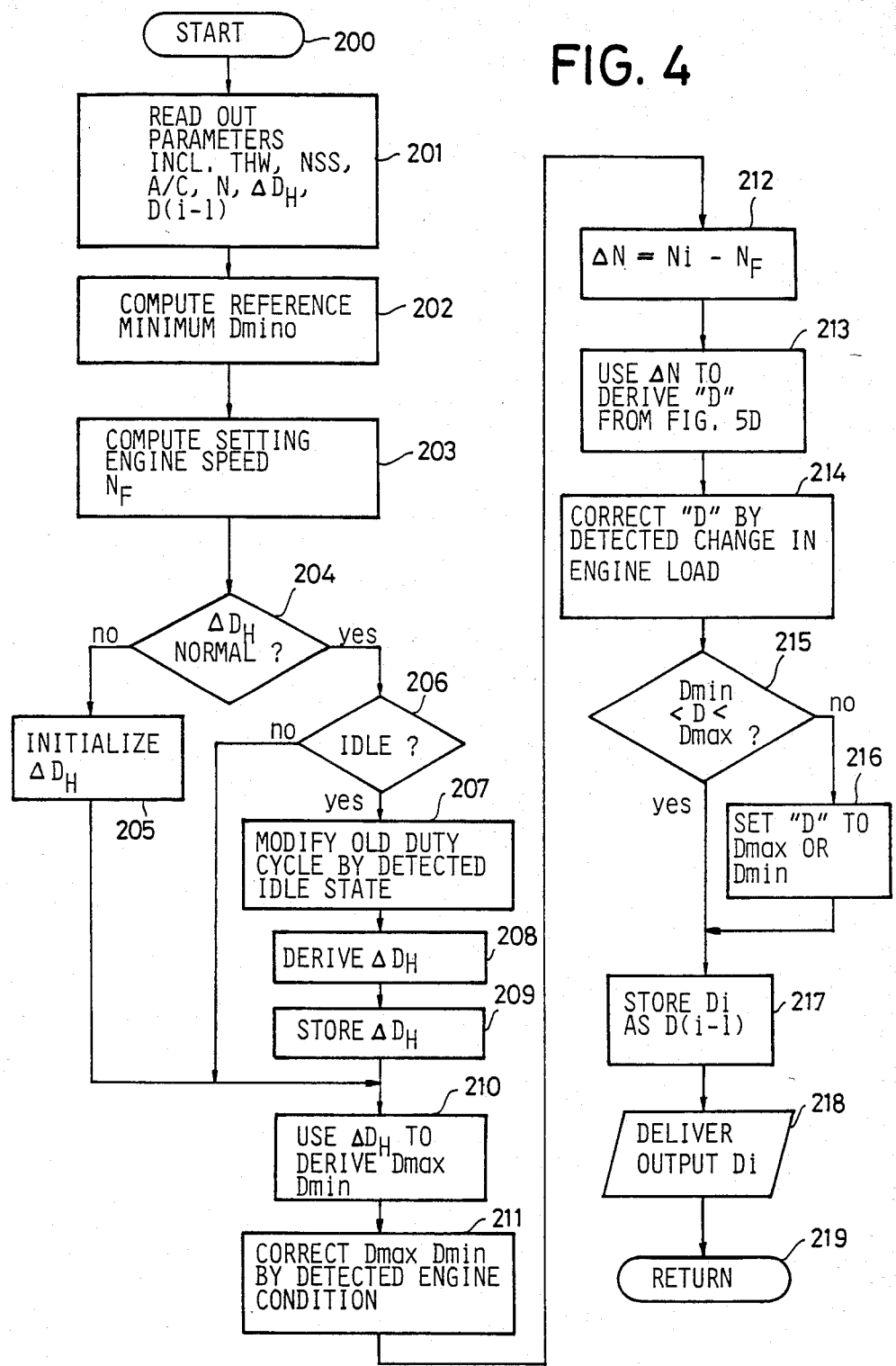
FIG. 4 is a flowchart of an auxiliary air computing routine included in the main routine of FIG. 3.
Figure 5A:
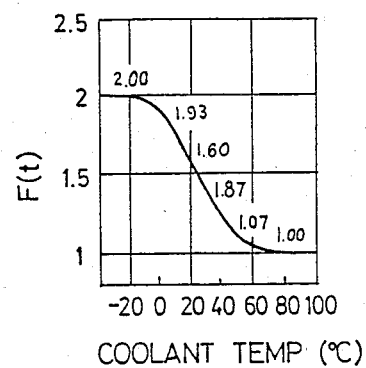
FIGS. 5A through 5D are graphs useful for understanding the operation of the microcomputer of FIG. 2.

First of all the auxiliary airflow computing routine 200 will be described in detail with reference to FIG. 4. This routine is provided to control the duty cycle of the solenoid operated valve 30 of FIG. 1 so that the airflow through the bypass passages 21 and 22 is controlled. The duty cycle is referred to as a control amount D hereafter. When the operational flow enters into the auxiliary airflow computing routine 200, input data necessary for intended control are read out at a step 201. Namely, the coolant temperature signal THW, air conditioner signal A/C, torque converter signal NSS, starter signal STA, temperature function map data F(t) of FIG. 5A, previously outputted control amount $D(i-1)$, a correction amount $\Delta D_H$ stored in the nonvolatile RAM 106, engine speed N at this time, and the like are read out. However, when the starter signal STA has been detected to be ON, the previous control amount $D(i-1)$ is not suitable, and therefore, a suitable value will be derived by using the temperature function map. In a following step 202, a lower limit Dmino of the control amount, which will be a reference, is found as a function of a coolant temperature by using the temperature function map F(t).

Figure 5B:
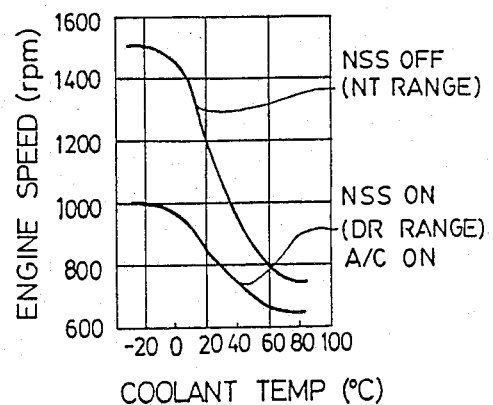

Then in a step 203, a reference or setting engine speed $N_F$ is computed from various operating modes. For instance, the setting engine speed $N_F$ is computed on the basis of the engine coolant temperature, whether the torque converter signal NSS indicates neutral (NT) or drive (DR) range, the air conditioner signal A/C is ON or OFF and the like so that calculation is effected to find the setting engine speed corresponding to various operating conditions as shown in FIG. 5B.

Proceeding to a step 204, it is detected to see whether the idle reference correction amount $\Delta D_H$, which has been read out in the step 202 from the nonvolatile RAM 106, is within a normal range or not. Namely, it is detected whether the value of $\Delta D_H$ is abnormal due to some reasons, for instance disconnection of the terminal of the battery 60. If the value of $\Delta D_H$ is found to abnormal, a step 205 is executed in which a suitable fixed correction amount $\Delta D_{HO}$ stored in the ROM 108 is substituted for $\Delta D_H$ for initialization thereof. On the other hand, if the idle reference correction amount $\Delta D_H$ lies within the normal range, a step 206 takes place to check to see whether the engine is in a steady idle state by detecting the changes in various engine operating conditions. For instance, it is confirmed that the air conditioner signal A/C and the torque converter signal NSS are not changed from a previous cycle, that the engine is sufficiently warmed up, and that the difference between the previous engine speed $N(i-1)$ and the present engine speed Ni is smaller than a predetermined value. Here, what is meant by "present engine speed Ni" is a latest or newest instantaneous engine speed, and the way of measuring latest engine speed will be described later. When all the above conditions are satisfied, the CPU 100 regards that the engine 10 is in steady idle state to advance to a step 207. If one of the above conditions is not fulfiled, a step 210 is then executed.

In a step 207 following the step 206, the previous control amount $D(i-1)$ is modified to a new correction amount $D(i'-1)$ by detecting the state of the torque converter signal NSS and the air conditioner signal A/C. Namely, the previous control amount $D(i-1)$ is modified depending on whether the torque converter signal NSS indicates neutral range (NR) or drive range (DR), and whether the air conditioner signal A/C indicates on-state or off-state.

In a step 208, the control amount $D(i-1)$ obtained in the step 207 is used as a reference control amount $D_{RD}$, and the value of the idle reference correction amount $\Delta D_H$ is corrected so that the difference between the idle reference control amount DRD and the reference control lower limit Dmino obtained in the step 202 equals a constant value $\Delta H1$. Namely, $\Delta D_H$ is computed by using the following formula:

$$\Delta D_H = D_{RD} - Dmino - D_{H1}$$

and the obtained vlaue of $\Delta D_H$ is then stored in the RAM 106 in a following step 209.

In a following step 210, the correction amount $\Delta D_H$ stored in the RAM 106 is read out to compute an upper limit Dmax and lower limit Dmin of a control amount or duty cycle suitable for a standard operating mode, i.e an operating condition in which the torque converter signal NSS indicates neutral range NR and the air conditioner signal A/C indicates OFF state. Namely, the following calculations are executed:

$$Dmin = Dmino + \Delta D_H$$

$$Dmax = Dmin + \Delta H2$$

wheren $\Delta H2$ is a constant.

The program proceeds to a step 211 to modify the upper and lower limits Dmax and Dmin of the control amount in accordance with operating conditions, namely on the basis of the torque converter position and the air conditioner operating state. In a following step 212, the difference $\Delta N$ between the engine speed N read out the step 201 and the setting engine speed $N_F$ obtained in the step 203 is computed as follows:

$$\Delta N = Ni - N_F$$

Figure 5C:
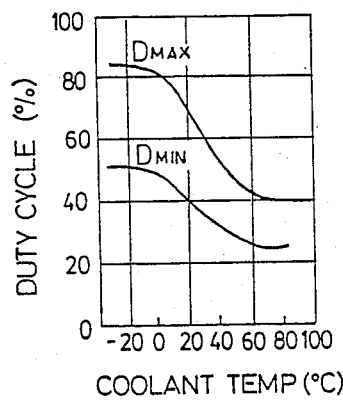
Figure 5D:
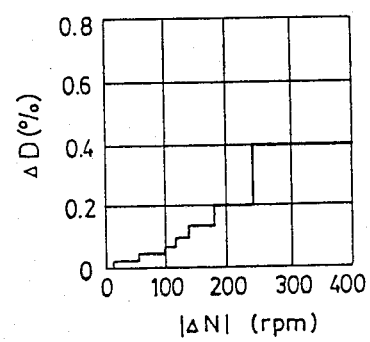

In a step 213, a control correction value $\Delta D$ suitable for the absolute value of the difference value $\Delta N$ is found from a predetermined map of FIG. 5D, so that the previous control amount $D(i-1)$ is corrected by combining the control correction value $\Delta D$ with the previous correction amount $D(i-1)$ read out by computing:

$D = D(i-1) - \Delta D$ when $\Delta D$ is greater than zero;
$D = D(i-1) + \Delta D$ when $\Delta D$ is equal to or smaller than zero.

The correction amount D corrected in the step 213 is further corrected at a step 214 in response to any change in the operating conditions of the engine 10 to suppress the overshooting or undershooting of the engine speed which may be caused by such change. To this end the change in the torque converter and air conditioner signals NSS and A/C is detected to correct the correction amount D in advance.

The CPU 100 checks, in a following step 215, to see whether the correction amount D derived in the step 214 is within the range between the upper and lower limits Dmax and Dmin (see FIG. 5C). If either the lower or upper limit is exceeded, the correction amount D is set equal to Dmin or Dmax, respectively, at step 216. The steps 214 and 216 are followed by a step 217 to store the correction amount D in the RAM 106 as $D(i-1)$, and subsequently followed by a step 218 to deliver the correction amount D, i.e. the duty cycle, to the auxiliary air control output circuit 112 for controlling the air control valve 30.

Namely, the control amount D indicative of the duty cycle, which is computed by the CPU 100, is temporarily stored in the auxiliary air control output circuit 112, so that the stored signal is converted into a driving pulse signal having a duty cycle determined by the stored signal, in response to a timing command signal from the CPU 100 to be fed to the air control valve 30. The air control valve 30 is thus controlled to change the bypassing airflow so that the engine idle speed converges to the setting speed $N_F$.

After executing the auxiliary airflow computing routine 200, the program proceeds to the engine parameter reading routine so that various engine parameters, such as intake airflow Q, coolant temperature or the like, are taken in through the input port 103. Then the aforementioned ignition timing computing routine 300 is executed.

Figure 6:
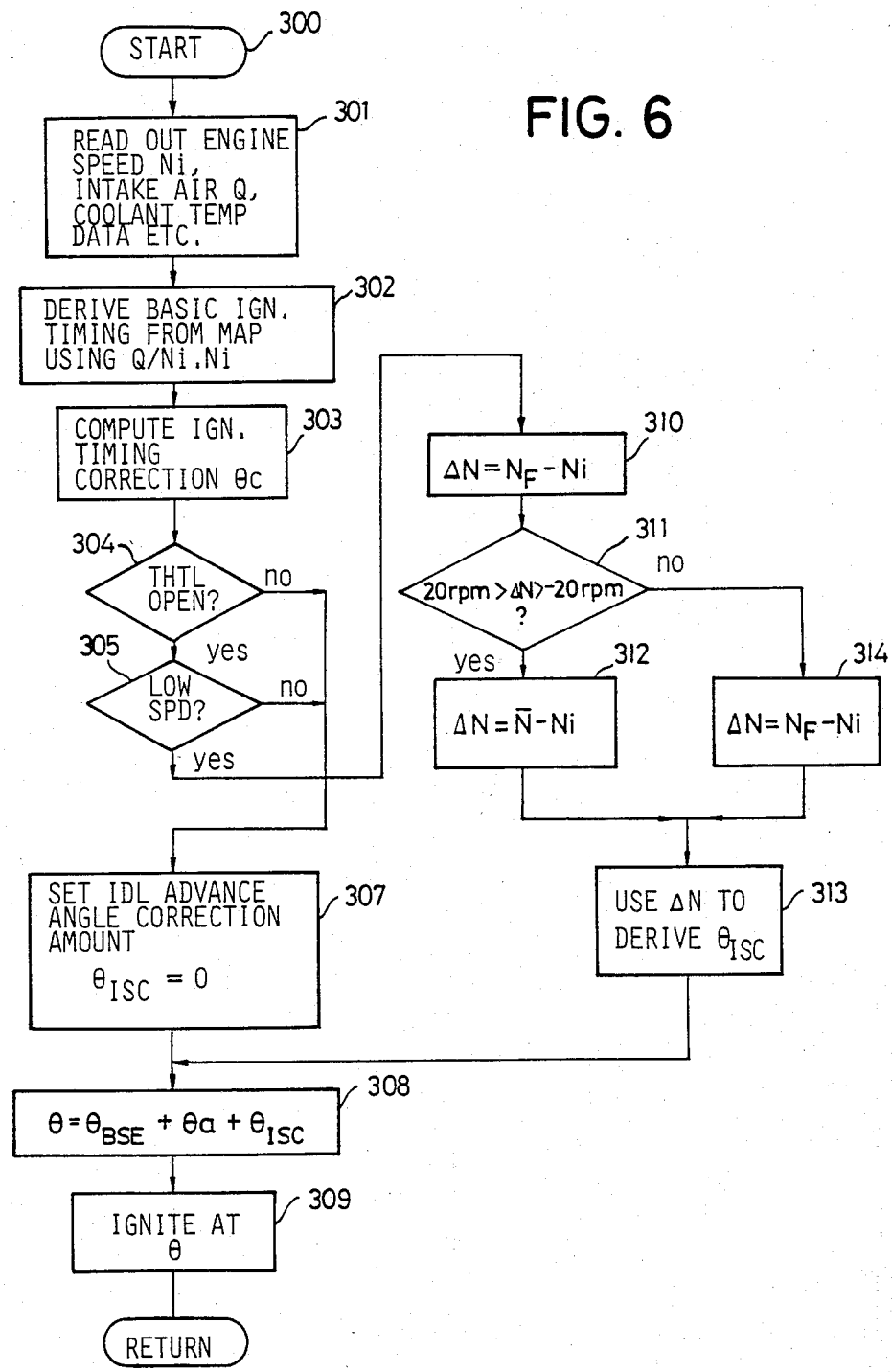
FIG. 6 is a flowchart of an ignition timing computing routine included in the main routine of FIG. 3.

Referring now to FIG. 6, a detailed diagram of steps included in the ignition timing computing routine 300 is shown. Subsequent to a starting step, a step 301 is executed to read out necessary data to be used in the ignition timing control among previously stored data in the RAM 106. Namely, the latest instantaneous engine speed Ni, an average engine speed $\overline{N}$, intake airflow Q, coolant temperature signal THW, starter signal STA, vehicle speed signal SPD, air conditioner signal A/C, throttle switch signal and the like are read out. The above-mentioned average engine speed $\overline{N}$ is obtained by averaging a plurality of instantaneous engine speed values Ni, $N(i-1)$, $N(i-2)$ ... as will be described later with reference to FIG. 10. In a following step 302, a basic ignition timing advance angle $\theta_{BSE}$ is computed by using a basic advance angle map which is a function of the intake airflow Q and the engine speed (Q/Ni, Ni). In the present embodiment, the instantaneous engine speed signal Ni is periodically detected by counting the number of clock pulses appearing within a period of time corresponding to 120 degrees in crankshaft rotational angle, where the engine speed sensor or electromagnetic pickup 37 generates a pulse for every 30 degrees. The average engine speed N is an average value of a plurality of Ni values within a predetermined period of time. Since the method of determining the basic advance angle $\theta_{BSE}$ in accordance with engine parameters by using a map is well known, further description thereof is omitted.

In a step 303, an advance angle correction amount $\theta a$ is found by effecting corrective calculations of advance angle in accordance with various engine parameters.

For instance, advance angle correction for warming up and fixed advance angle correction are performed. These correction amounts are stored in a memory in the form of respective maps so that appropriate data are derived therefrom.

Then in following steps 304 through 305, it is checked to see if the engine is in idle state in which ignition timing control is to be effected. Namely, in the step 304 it is checked to see if the throttle valve is fully or nearly closed or not, and in the step 305, it is checked to see if the vehicle speed is less than 2 Km/h so that the vehicle is not moving or almost stopping.

When one or both of the conditions of the steps 304 and 305 is not fulfilled, the operational flow goes to a step 307 in which an idle advance angle correction amount $\theta_{ISC}$ is set to zero. On the other hand, when both the conditions are fulfilled in the steps 304 and 305, namely, when it is detected that the engine is in idle state, a step 310 takes place.

Prior to describing the operation executed when it is detected that the engine is in idle state, steps following the step 307 will be described. In a step 308, an advance angle $\theta$ is found by adding the avance angle correction amount $\theta a$ and the idle advance angle correction amount $\theta_{ISC}$ (which is zero in this case) to the basic advance angle $\theta_{BSE}$ obtained previously. The value of this advance angle $\theta$ is then temporarily stored in the ignition output circuit 113 of FIG. 2. This stored advance angle data $\theta$ is used in such a manner that the ignition device 39 is controlled so that ignition timing is controlled thereby, with the data being read out in response to output timing command from the CPU 100.

Turning back to the step 310, which is executed after the detection of engine idle state, an instantaneous value Ni of the engine speed N measured for a latest period corresponding to crankshaft rotational angle of 120 degrees obtained in the step 302, is read out. In addition, a latest value of the setting engine speed $N_F$ obtained in the auxiliary airflow computing routine of FIG. 4 is also read out. Then the difference between these two values Ni and $N_F$ is calculated as follows:

$$\Delta N = N_F - Ni$$

In a following step 311, it is detected whether the difference $\Delta N$ lies within a predetermined range. For instance, it is detected whether the following formula is satisfied or not:

$$20 \text{ rpm} > \Delta N > -20 \text{ rpm}$$

When this formula is satisfied, namely when the answer of the step 311 is YES, a step 312 is executed in which the difference $\Delta N$ is calculated by using the average engine speed $\overline{N}$ in place of the setting engine speed $N_F$.

Figure 8:
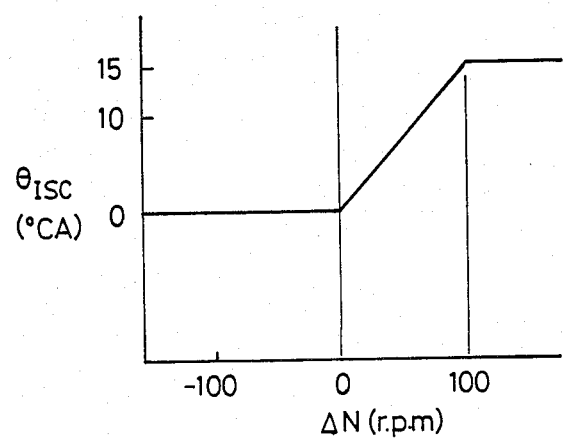
FIGS. 8 and 9 are graphs showing the data maps providing relationship between engine speed difference and advance angle correction amount.

On the other hand, when the formula is not satisfied, a step 314 takes place to calculate the difference $\Delta N$. By using the difference value of $\Delta N$ obtained at step 312 or 314, an idle advance angle correction amount $\theta_{ISC}$ is found from a $\Delta N$ map shown in FIG. 8 in a following step 313. The map of FIG. 8 is an example showing the relationship between $\Delta N$ and $\theta_{ISC}$, and therefore, another $\Delta N$ map of FIG. 9 may be used in place of the $\Delta N$ map of FIG. 8.

After the value of the idle advance angle correction amount $\theta_{ISC}$ has been obtained in the step 313, the value of an advance angle $\theta (\theta = \theta_{BSE} + \theta a + \theta_{ISC})$ is calculated in the following step 308 in the same manner as described in the above. Then in the step 309, the advance angle $\theta$ is fed to the ignition output circuit 113 of FIG. 2 as an ignition timing signal, causing the ignition device 39 to effect ignition with the advance angle $\theta$.

In the above-described embodiment, feedback control of the engine speed is effected throughout the entire range with the setting engine speed $N_F$. However, in the case that no setting engine speed $N_F$ is provided, for instance, when no auxiliary airflow computing routine 200 is provided or when idle engine speed is controlled by way of an open loop, an average engine speed $\overline{N}$ may be used in place of the setting engine speed $N_F$ throughout the entire range.

Figure 7:
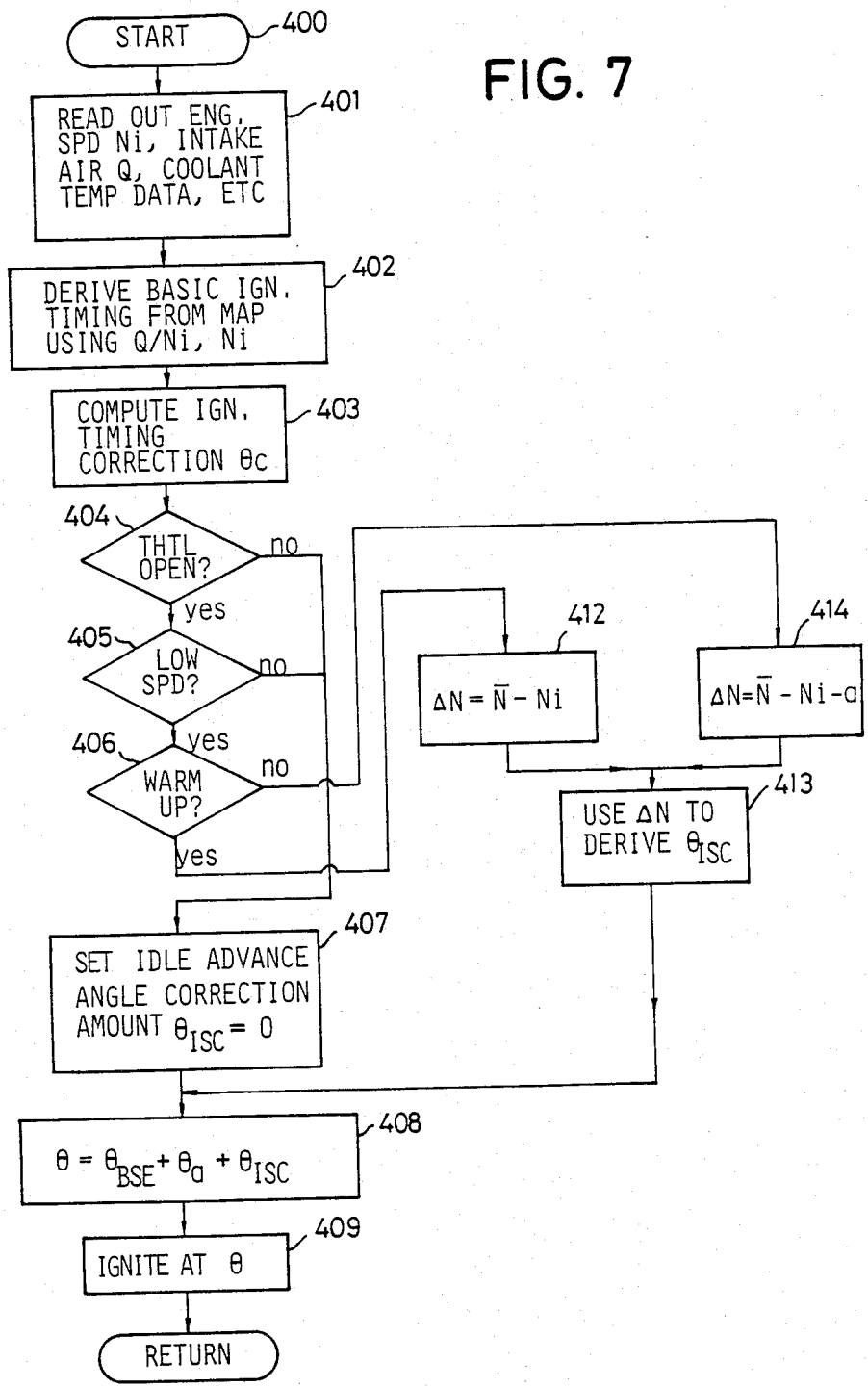
FIG. 7 is a flowchart of another ignition timing computing routine which may be used in place of the routine of FIG. 6.

Hence, reference is now made to FIG. 7 which shows another ignition timing computing routine 400 which may be used in place of the routine 300 of FIG. 6. In the flowchart of FIG. 7, steps 401 through 405 are the same as steps 301 through 305 of FIG. 6. In the step 405 if it is detected that the vehicle is not moving or almost stopping because the vehicle speed is less that 2 Km/h, a step 406 is executed in which it is checked to see whether warming up has been completed. If the answer of the step 406 is YES, a step 412 is executed to calculate $\Delta N$ in the same manner as in the step 312 of FIG. 6. On the other hand, if warming up has not yet been completed, a step 414 takes place to calculate $\Delta N$ by using the following formula:

$$\Delta N = \overline{N} - Ni - a$$

wherein a is constant such as 5 rpm.

Figure 9:
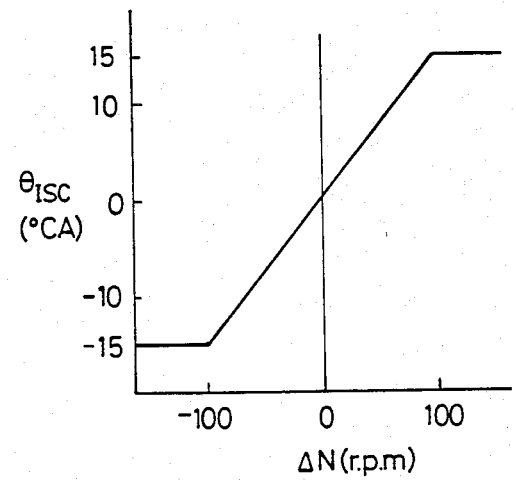

A following step 413 corresponds to the step 313 so that a value of the idle advance angle correction amount $\theta_{ISC}$ is derived from the $\Delta N$ map of FIG. 8 or FIG. 9 in accordance with the difference $\Delta N$ obtained in the step 412 or 414. Steps 408 and 409 following the step 413 are the same as steps 308 and 309 of FIG. 6 so that advance angle $\theta$ is calculated to control the ignition timing.

Turning back to the step 405, if the vehicle speed is detected to be over 2 Km/h, a step 407 is executed in which idle advance angle correction amount $\theta_{ISC}$ is set to zero, prior to proceeding to the step 408.

In this way, when the ignition timing computing routine 200, 400 of FIG. 6 or FIG. 7 is completed, the aforementioned fuel injection amount computing routine 500 of FIG. 3 is executed in which basic fuel injection time period is computed by using the engine speed N and the intake airflow Q, and this basic fuel injection time is corrected or modified by various engine parameters, such as the coolant temperature, intake air temperature and the like. Since such a control of fuel injection amount is well known in the field of internal combustion engine control, detailed description of the routine 500 is omitted.

Figure 10:
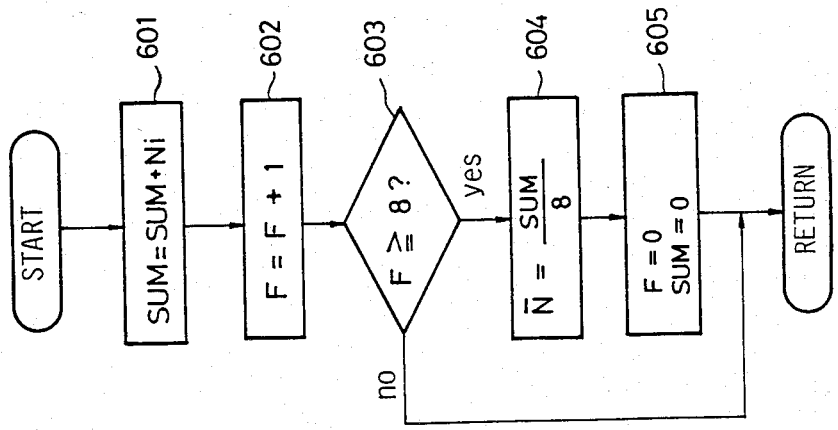
FIG. 10 is a flowchart of an interrupt service routine for finding an average engine speed.

Reference is now made to FIG. 10 showing an interrupt service routine for computing the aforementioned average engine speed $\overline{N}$. This interrupt service routine is arranged to be executed at an interval, such as 200 microseconds or an interval defined by a predetermined number of engine revolutions. In a step 601, the latest instantaneous engine speed Ni is added to a variable SUM to increment the value of SUM which is initially zero. Then in a following step 602, a flag F, which is also initially zero, is increased by one. In a step 603, it is checked to see whether the value of the flag F is greater than or equal to eight. If F is within a range of 0-7, the operational flow returns to the main routine. On the other hand, if F is eight, the value of SUM is divided by eight in a following step 604 to renew the average engine speed $\overline{N}$. Then F and SUM are both reset to zero in a step 605 prior to returning to the main routine.

As described in the above, each computing routine of FIG. 3 is executed at a high speed so that computed data are delivered to corresponding actuators at a given timing determined by the CPU 100 so that the actuators are respectively driven. Therefore, when the engine 10 is regarded as being in a given idle state, the auxiliary airflow and the ignition timing are both well controlled so that engine speed equals the setting engine speed $N_F$. Namely, when engine speed varies drastically, ignition timing control effectively functions with quick response so that variation in idle engine speed is effectively suppressed. Moreover, in the case that no setting engine speed $N_F$ is provided, variation in idle engine speed can be effectively reduced in a similar manner.

Summarizing the method according to the present invention, when a setting engine speed $N_F$ is provided as in FIG. 6, if the latest instantaneous engine speed Ni is within a given range set by adding and subtracting a predetermined engine speed $\chi$ to and from the setting engine speed $N_F$ as ($N_F - \chi < Ni < N_F + \chi$), the average engine speed $\overline{N}$ is used as a reference value in place of the setting engine speed $N_F$ so that difference $\Delta N = \overline{N} - Ni$ is computed to find an advance angle correction amount $\theta_{ISC}$ suitable for the obtained $\Delta N$ from the $\Delta N$ map. On the contrary, if Ni is out of the above range, the difference is computed as $\Delta N = N_F - Ni$ to find a suitable advance angle correction amount $\theta_{ISC}$ in the same manner as in the above. In the case that no setting engine speed $N_F$ is provided as in FIG. 7, the average engine speed $\overline{N}$ is used as the reference engine speed for computing the difference $\Delta N = \overline{N} - Ni$ so that a suitable advance angle correction amount $\theta_{ISC}$ can be found from the $\Delta N$ map.

Figure 11:
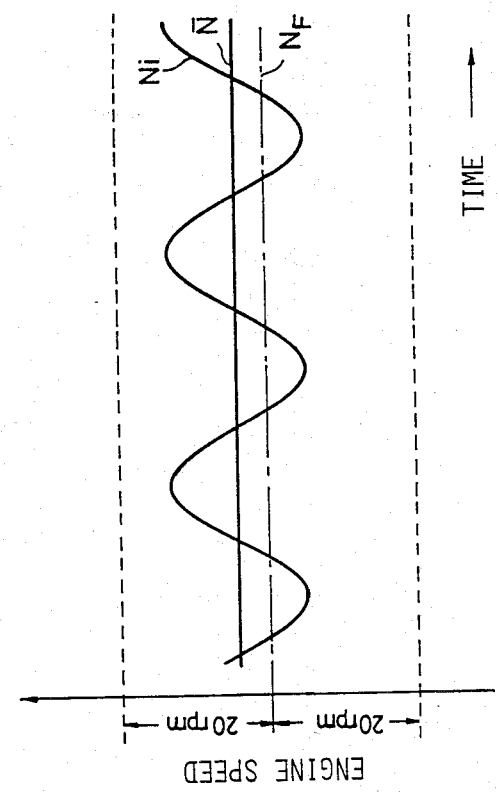
FIG. 11 is an explanatory diagram showing the way of idle engine speed control according to the present invention.

FIG. 11 shows the above-described point. Assuming that the instantaneous engine speed Ni varies like a sine curve, it will be understood that the engine speed control can be readily effected if the average engine speed $\overline{N}$ is used as a reference value because the average engine speed $\overline{N}$ is substantially the center of fluctuation. If, however, engine speed control is further effected to converge the engine speed Ni to the setting engine speed $N_F$ as in conventional techniques, it takes more time, while engine speed tends to be unstable. Although the use of the average engine speed $\overline{N}$ as the reference cannot provide an extremely accurate control with a center value equal to the setting engine speed $N_F$, the difference between the average engine speed $\overline{N}$ and the setting engine speed $N_F$ does not result in undesirable control if the average engine speed $\overline{N}$ is used only when the instantaneous engine speed Ni lies within a narrow range, such as $N_F \pm 20$ rpm.

The above-described embodiments are just examples of the present invention, and therefore, it will be apparent for those skilled in the art that many modifications and variations may be made without departing from the spirit of the present invention.

What is claimed is:

1. A method for controlling the idle speed of an internal combustion engine having means for causing ignition to occur in said engine at variable ignition timing, comprising the steps of:
   (a) detecting when said engine is in idle state;
   (b) detecting the magnitude of a variation of the speed of said engine in response to the step (a), the step (b) including a step of detecting the difference between an average engine speed of a plurality of measurements and a latest instantaneous engine speed; and
   (c) adjusting said variable ignition timing as a function of the detected magnitude of engine speed variation in a direction toward reducing the magnitude of subsequently occurring engine speed variation.

2. A method as claimed in claim 1, wherein said average engine speed is detected by averaging a plurality of engine speed values obtained within a predetermined period of time.

3. A method as claimed in claim 1, wherein said average engine speed is detected by averaging a plurality of engine speed values obtained within a period of time in which a predetermined number of engine revolutions occurred.

4. A method as claimed in claim 1, further comprising a step of detecting whether the latest instantaneous engine speed is within a predetermined range including a predetermined setting engine speed.

5. A method as claimed in claim 4, wherein said step of detecting the variation magnitude is executed only when said latest instantaneous engine speed is within said predetermined range.

6. A method as claimed in claim 4, wherein said step (b) further comprises a step of detecting difference between said predetermined setting engine speed and said latest engine speed as the variation magnitude when said latest instantaneous engine speed is out of said predetermined range.

7. A method as claimed in claim 1, wherein said step of adjusting ignition timing is executed by adding an advance angle correction amount to a basic advance angle which is determined by the engine speed and the intake airflow, said advance angle correction amount being derived from a map stored in a memory so that a value suitable for the difference between said average engine speed and said latest engine speed is found.

8. A method for controlling the idle speed of an internal combustion engine having means for causing ignition to occur in said engine at variable ignition timing, comprising the steps of:
   (a) detecting when said engine is in idle state;
   (b) detecting the difference between a setting engine speed and an instantaneous engine speed;
   (c) detecting whether the difference derived in said step (b) is within a predetermined range or not;
   (d) detecting the difference between an average engine speed of a plurality of measurements and said latest instantaneous engine speed when said latest instantaneous engine speed is within said predetermined range;
   (e) detecting difference between said predetermined setting engine speed and said latest engine speed when said latest instantaneous engine speed is out of said predetermined range; and
   (f) adjusting said variable ignition timing as a function of the difference derived from said step (d) or (e) in a direction toward reducing the difference so that subsequently occurring engine speed variation becomes small.

9. An idle speed control system for a spark ignition internal combustion engine having means for causing ignition to occur in said engine at variable ignition timing, comprising:

(a) a rotational speed sensor for detecting the rotational speed of said engine; and (b) computing means for detecting the magnitude of a variation of the speed of said engine in response to an output signal from said rotational speed sensor and a predetermined idle state of said engine, said computing means being arranged to detect the difference between an average engine speed of a plurality of measurements and a latest instantaneous engine speed, said computing means adjusting said variable ignition timing as a function of the detected magnitude of engine speed variation in a direction toward reducing the magnitude of subsequently occurring speed variation.

10. An idle speed control system as claimed in claim 9, wherein said computing means comprises:

means for computing said average engine speed value;

means for detecting the latest instantaneous value of the speed of said engine; and means for comparing the detected latest instantaneous value with said average engine speed value.

11. An idle speed control system as claimed in claim 9, further comprising:

means for detecting at least one engine operating parameter and means for setting a reference engine speed as a function of said detected engine operating parameter.

12. An idle speed control system as claimed in claim 11, wherein said one engine operating parameter is the temperature of said engine.

13. An idle speed control system for a spark ignition internal combustion engine having means for causing ignition to occur in said engine at variable ignition timing, comprising:

(a) a rotational speed sensor for detecting the rotational speed of said engine; and (b) computing means for detecting the magnitude of a variation of the speed of said engine in response to an output signal from said rotational speed sensor, said computing means being arranged to detect whether an instantaneous engine speed is within a predetermined range centering around a setting engine speed; to detect a difference between an average engine speed of a plurality of measurements and said latest instantaneous engine speed when said latest instantaneous engine speed is within said predetermined range; to detect a difference between said predetermined setting speed and said latest engine speed when said latest instantaneous engine speed is out of said predetermined range; said computing means adjusting said variable ignition timing as a function of the detected magnitude of engine speed variation in a direction reducing the magnitude of subsequently occurring speed variation.

* * * * *